May 22, 1956 G. C. TOWER 2,746,227
ROTARY LAWN MOWER
Filed Aug. 30, 1954 4 Sheets-Sheet 1
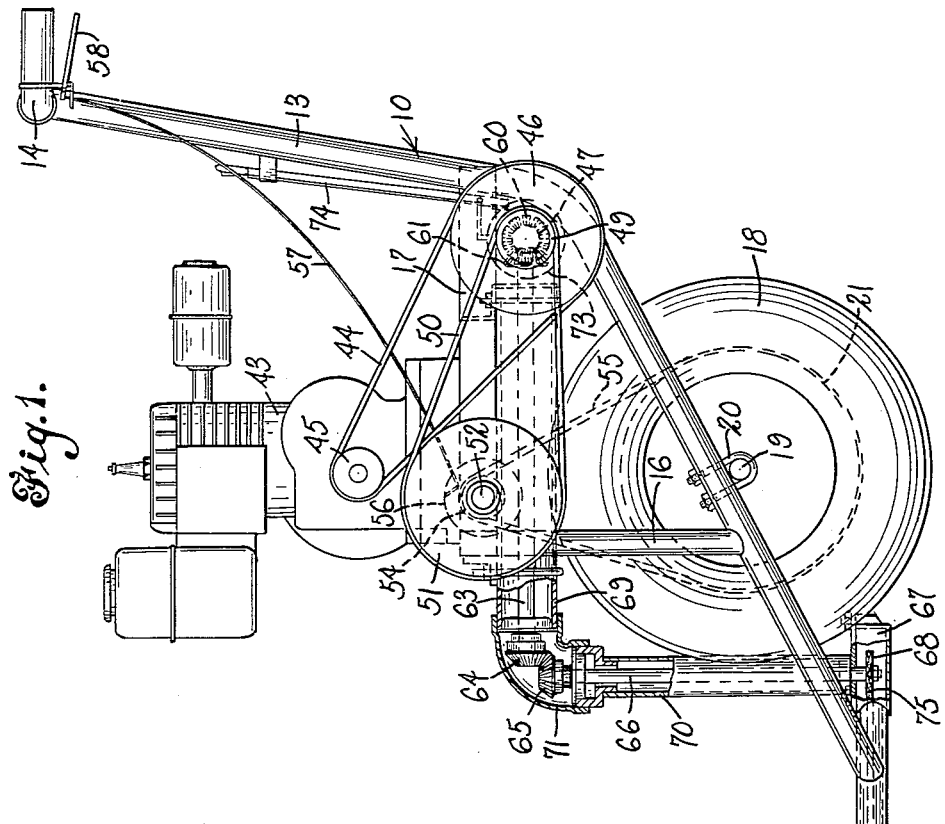
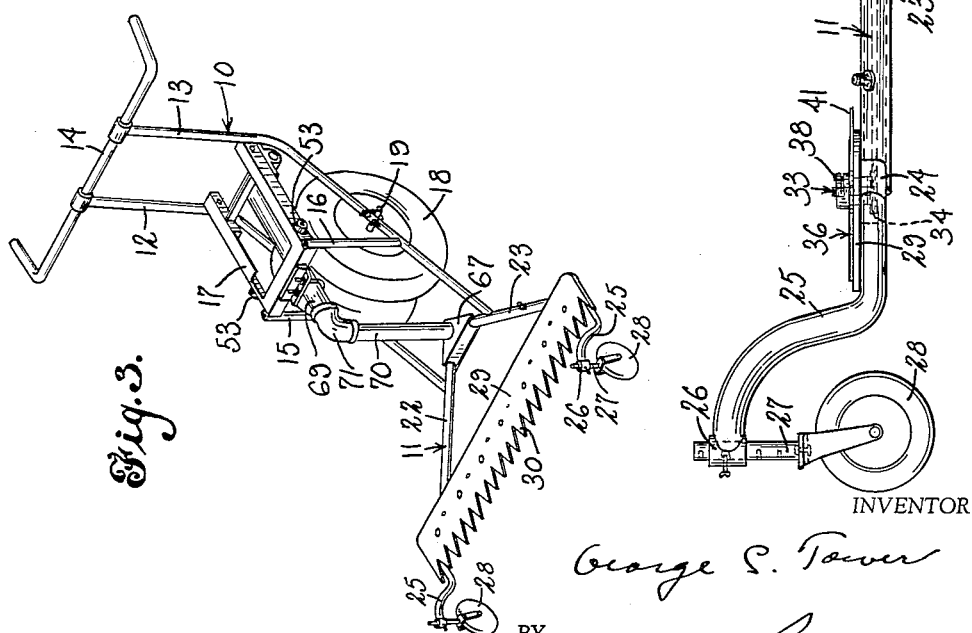
INVENTOR
George C. Tower
BY
Rockwell Bartholow
ATTORNEYS

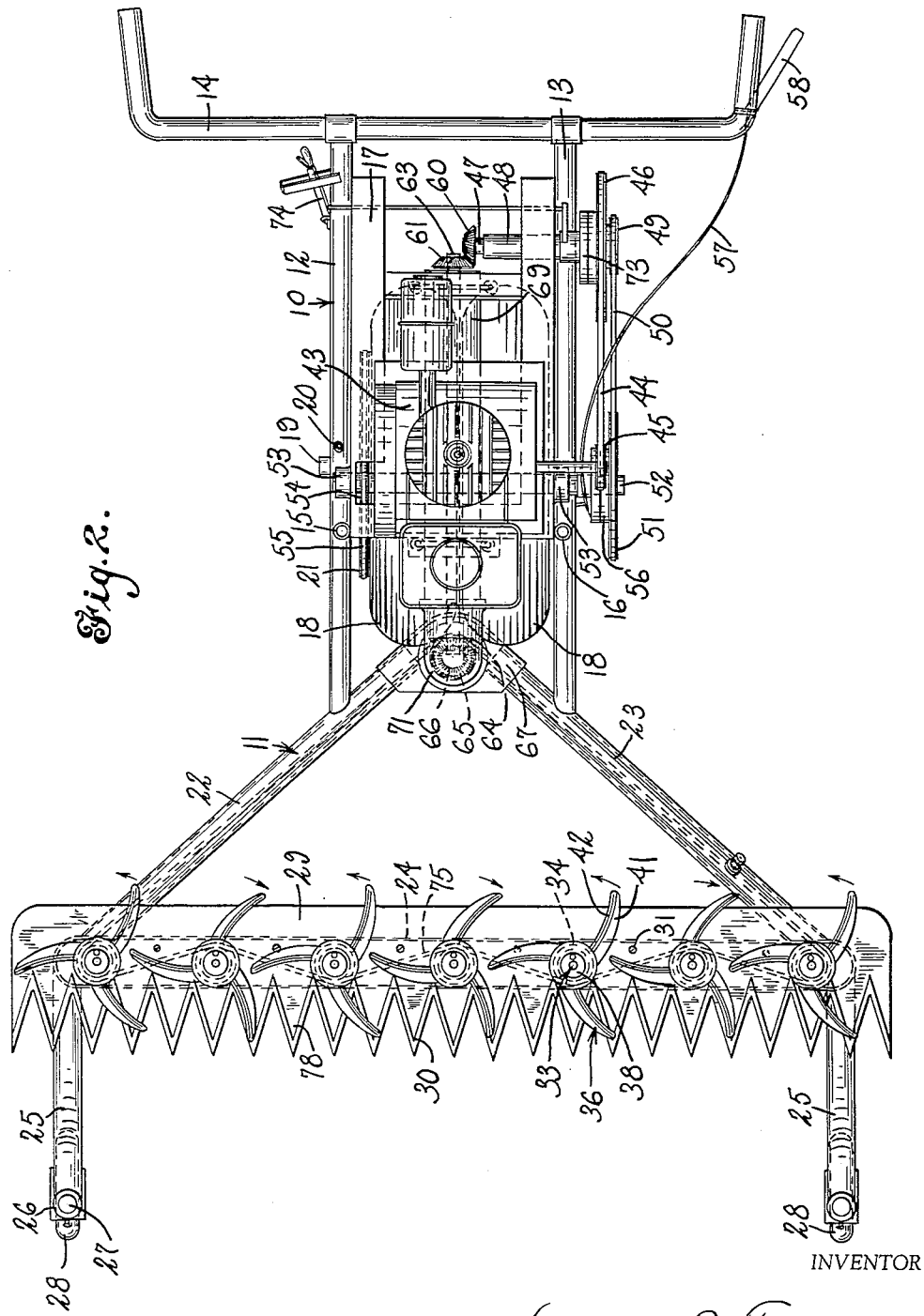

INVENTOR
George C. Tower
BY Rockwell-Raichston
ATTORNEYS

May 22, 1956 G. C. TOWER 2,746,227
ROTARY LAWN MOWER
Filed Aug. 30, 1954 4 Sheets-Sheet 4

INVENTOR
George C. Tower
BY
ATTORNEYS

United States Patent Office 2,746,227
Patented May 22, 1956

2,746,227

ROTARY LAWN MOWER

George C. Tower, Hamden, Conn., assignor to Consolidated Industries, Incorporated, West Cheshire, Conn., a corporation of Connecticut Application August 30, 1954, Serial No. 452,824

9 Claims. (Cl. 56—25.4)

This invention relates to mowing machines and chiefly to a power driven mowing machine particularly adapted for use in mowing grass or other material regardless of the height to which it may have grown.

While not restricted to this use, the device of the present application is particularly adapted for use in lawn mowing machines or the like, and is designed to overcome many disadvantages of prior mowers used for this purpose.

Lawn mowers of the usual type have the disadvantage that they are not efficient when the material to be cut is relatively tall. Moreover, the ordinary lawn mower will not chop up the material which is cut but will leave it in substantially the length which has been severed. In the present invention, it is contemplated to provide a mower which will cut grass or other material efficiently regardless of its height and which will also serve to comminute or chop up the material that has been cut so that it will be left in relatively fine condition and will not interfere with the growth of the lawn after cutting.

It is also a feature of the present invention to provide a relatively simple and inexpensive supporting frame to carry the power mechanism and the mowing mechanism and at the same time support these parts in proper relation to each other. This supporting frame also includes an auxiliary or cutter frame of hollow form, this frame being substantially triangular in shape and housing the cutter chain. This frame is also substantially closed so that it may be filled with a lubricant and the driving chain may, therefore, be operated in this lubricant, thus reducing wear upon the parts and providing for a minimum of friction in operation.

One object of the invention is to provide a simple and inexpensive power mowing machine of the character described.

Another object of the invention is to provide a power mowing machine wherein the cutter mechanism consists of a plurality of rotating cutters having cutter blades which overlap in their rotation and which are so driven that each cutter will rotatate in a direction opposite to that of the adjacent cutter or cutters.

Still another object of the invention is to provide a power mowing machine of the character described provided with a hollow frame within which is mounted an endless driving chain, and provided with a plurality of rotating cutters supported on one portion of this frame and driven by this chain, whereby the chain may be operated in a lubricant contained by the hollow frame.

To these and other ends the invention consists in the novel features and combinations of parts to be hereinafter described and claimed.

In the accompanying drawings:

Fig. 1 is a side elevation of a mowing machine embodying my invention with parts broken away and shown in section;

Fig. 2 is a top plan view of the device;

Fig. 3 is a perspective view on a reduced scale of the frame of the machine with some of the working mechanism being omitted for the sake of clearness;

Figure 4:
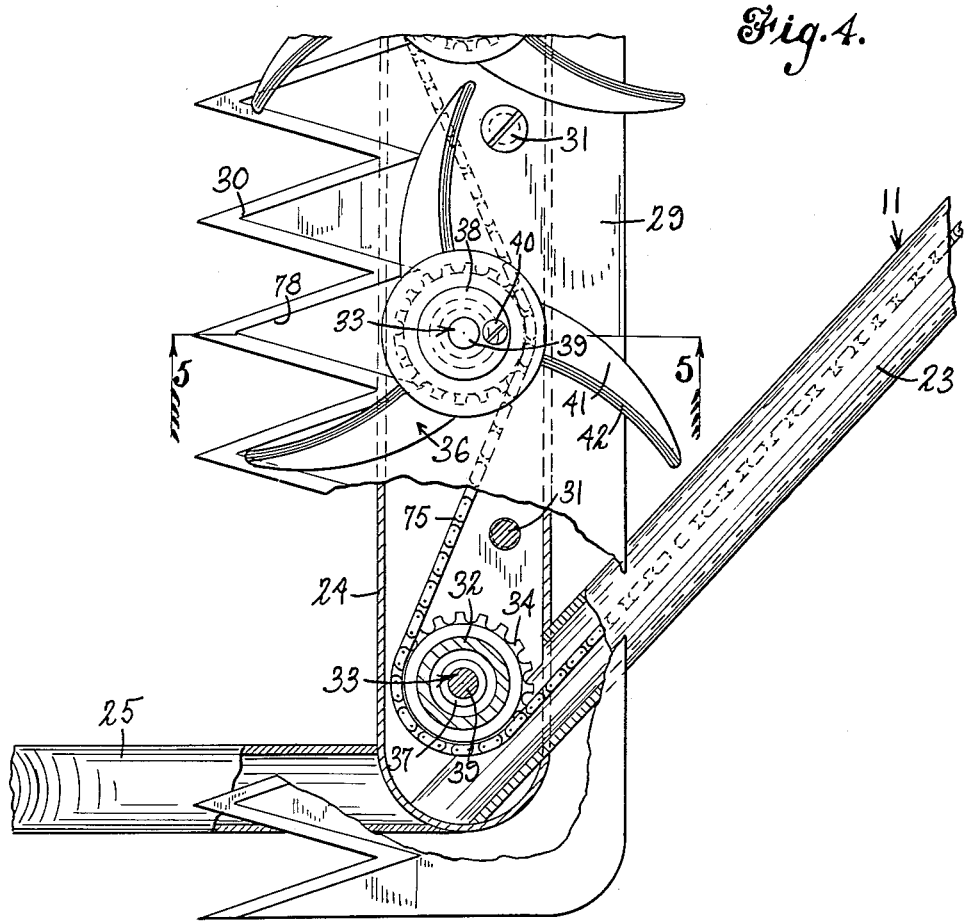
Fig. 4 is an enlarged top plan view of a portion of the cutter mechanism with some parts broken away and shown in section.

To illustrate a preferred embodiment of my invention I have shown in the drawings, a mower comprising a wheeled main frame designated generally by the numeral 10 and a cutter frame designated generally by the numeral 11. The wheeled frame comprises a pair of side frame members 12 and 13 disposed in substantially parallel relation. These members are of angle form so that the lower portions of these members extend in a direction inclined to the horizontal while the upper ends are substantially vertical. At the upper ends of these members is secured a handle bar 14 by which the device may be steered.

Projecting upwardly from the inclined portion of each of the members 12 and 13 are supporting elements 15 and 16 to the upper ends of which is secured a base or platform 17 of U-shaped form. The rear ends of the legs of the U-shaped platform 17 are secured to the vertical portions of the frame members 12 and 13.

Rotatively mounted between the lower inclined portions of the members 12 and 13 are a pair of ground wheels 18. These ground wheels are rotatably mounted upon an axle 19 carried in U-shaped hangers 20 and secured to one of the wheels 18 is a pulley 21 by which the wheels may be driven, as will be hereinafter described. It will be understood that the wheels are secured together so that both will be driven.

To the lower ends of the members 12 and 13 is secured a cutter frame of triangular form. This cutter frame comprises a pair of hollow tubular members 22 and 23 extending forwardly and outwardly from the main frame and secured to the forward ends of these members is a hollow U-shaped frame member 24 extending transversely of the path of travel of the machine. Thus the members 22, 23 comprise leg members, and 24 the base member of, a rigid cutter frame of triangular form the apex of which is disposed substantially on the longitudinally center line of the wheeled frame and which, as will be hereinafter described, may contain a lubricant through which the chain travels.

Secured to each end of the transversely extending U-shaped member 24 is a wheel support 25 which extends outwardly and then upwardly from the member 24, as shown more especially in Figs. 1 and 3. Each of these supports carries a bearing 26 in which is adjustably mounted the post 27 of a supporting caster wheel 28. The wheels 28 and the driving wheels 18 serve as the ground supports for the frame.

The cutter frame member 24, as previously described, is of U-shaped form and is closed at its upper side by a plate 29, secured to the member 24 by bolts 31, which extends transversely across the frame of the machine and is provided with forwardly projecting fingers 30, so that this plate serves as the finger bar of the cutting mechanism. This plate also covers the channel or U-shaped member 24 at the top so that it may contain a lubricant which may be placed therein.

Figure 5:
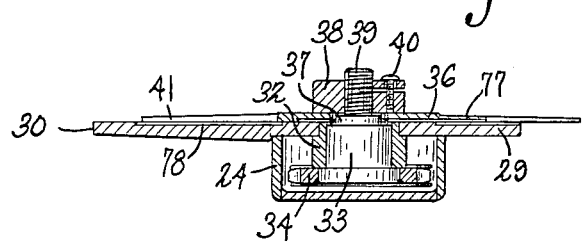
Fig. 5 is a sectional view on line 5—5 of Fig. 4.

As shown more especially in Fig. 5, bearing sleeves 32 are supported by the plate 29, which sleeves extend within the frame member 24 and within these bearing sleeves are rotatively mounted short shafts 33 having sprocket wheels 34 secured to their lower ends. Secured to the upper ends of the shafts 33 are bladed cutters 36, these cutters being mounted upon a shouldered portion 37 of these shafts and being held in place by nuts 38 threaded upon the reduced ends 39 of the shafts. The nuts are locked in place by a locking screw 40.

As shown more especially in Fig. 2 and Fig. 4, the blades 41 of the cutters are of such a length, that is, longer than half the distance between the axes of the cutters, so that the blades of one cutter will project into the path of the blades of an adjacent cutter in overlapping relation. With this arrangement, the grass, particularly if tall, will be cut more than once by the blades and will be comminuted so as to be thrown to the rear of the plate 29 in relatively finely divided form. The sharpened edges of the blades are shown at 42 and their direction of travel is indicated by the arrows on Fig. 2 from which it will be seen that each cutter rotates in a direction opposite to that of the adjacent cutter on either side thereof. As shown in Fig. 5 the blades lie closely upon the finger bar or plate 29 so that the grass will be efficiently sheared between the blades and the fingers 30.

Upon the platform 17 is mounted a motor 43 of any desired type shown as an internal combustion engine, and a belt 44 leads from a pulley 45 on the shaft of the motor to a pulley 46, loosely mounted upon a shaft 47 mounted in a bearing 48 carried at the under side of the platform. Secured to the pulley 46 is a second pulley 49 around which is trained a belt 50, which belt is trained around a pulley 51 carried by a shaft 52. This shaft 52 is carried by bearings 53 in the platform 17 and extends across this platform to the other side of the machine where it is provided with a pulley 54. Trained around the pulley 54 is a belt 55 which is also trained around the pulley 21 previously referred to which pulley is secured to one of the ground wheels 18 so as to drive the machine.

A clutch 56 is provided to clutch the pulley 51 to the shaft 52, this clutch being operated by a cable 57 leading to a lever 58 adjacent to the handle bars so that the forward motion of the vehicle may be controlled.

Upon the inner end of the shaft 47 is a beveled gear 60, the teeth of which mesh with a beveled gear 61 (Fig. 2) upon a shaft 63 extending longitudinally of the frame. Secured to the forward end of the shaft 63 (Fig. 1) is a bevel gear 64, the teeth of which mesh with a bevel gear 65 secured at the upper end of a vertical shaft 66, which shaft extends downwardly into a housing 67 and has a sprocket wheel 68 secured to its lower end. It will be noted that, as shown in Fig. 3, the rear ends of the tubular cutter frame members 22 and 23 are secured to the housing 67 and communicate with the interior thereof.

The shaft 63 is enclosed within, and rotatably mounted in, a tubular housing 69 and similarly the shaft 66 is mounted within a vertical housing 70. These housings are connected by an elbow 71, which encloses the bevel gears 64 and 65, and the housing 70 is connected at its lower end to the housing 67. Thus the drive from the pinion 61 to the sprocket 68 is wholly enclosed.

A clutch 73 serves to connect the pulley 49 with the shaft 47, this clutch being operable by a lever 74 on the frame member 12 so that the control of the drive mechanism to the cutters is under control of the operator when he is holding the handle bars 14.

Trained about the sprocket wheel 68 at the lower end of the shaft 66 is a cutter driving chain 75 of endless form, which chain passes forwardly through the tubular members 22 and 23 so as to be trained about the sprockets 34 secured to the lower ends of the shaft 33, which carry the rotating cutters 36. It will be noted from Fig. 2 of the drawings that the shafts of the cutters at each end of the cutter frame are so placed that they are substantially at the forward end of the members 22 and 23 so that these sprockets will properly receive and guide the endless chain around a triangular course.

It will be also noted from Fig. 2 of the drawings that the chain is passed first over the forward side and then over the rear side of the alternate sprocket wheels 34, so that each of these wheels and the cutters attached thereto will be rotated in a direction opposite to that of the adjacent wheel.

Figure 6:
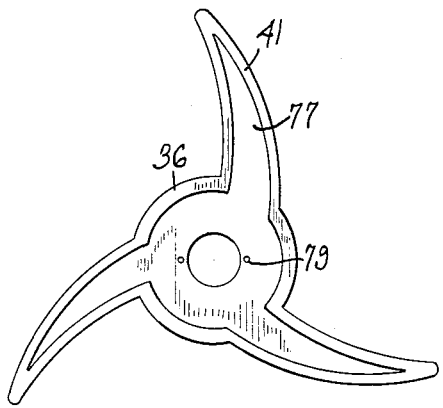
Fig. 6 is a plan view of of the under side of one of the cutters.

As shown in Fig. 6 of the drawings, the cutter blades are relieved rearwardly of their cutting edges on their lower faces, as indicated at 77, and likewise the fingers 30 are relieved on their upper faces rearwardly of the cutting edges, as shown at 78 in Fig. 4. Thus these edges are self-sharpening and can always be adjusted in proper cutting contact with each other.

Figure 7:
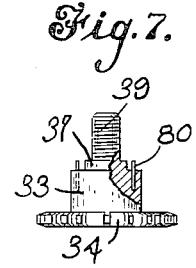
Fig. 7 is a detail view of the cutter shaft with parts broken away and shown in section.

To this end the cutters 36 are provided with openings 79, which openings are adapted to receive pins 80 (Fig. 7) projecting upwardly from the shouldered portion of the shaft 33. Thus the cutters are non-rotatably secured to the shafts, but at the same time are permitted a certain amount of vertical movement with respect to the shaft 33 so that they may be adjusted with respect to the cooperating shear fingers 30 by adjustment of the nut 38.

Figure 8:
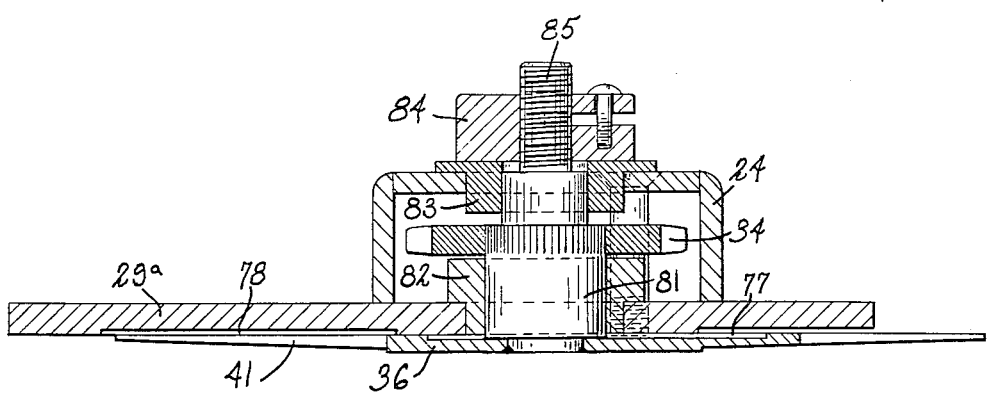
Fig. 8 is an enlarged view similar to Fig. 5 showing a modified form of cutting mechanism.

In Fig. 8 of the drawing I have shown a modified form of my invention wherein the channel or U-shaped frame member 24 is inverted so that the cutters 36 are mounted at the lower face thereof, so as to be closer to the ground and effect a closer cut. As shown in this figure, the cutters 36 are secured to the shaft 81 by welding or the like, and the shaft is mounted in a bearing 82 in the finger bar or plate 29a, and also in a bearing 83 mounted in the upper portion of the cutter frame member 24. The sprocket wheel 34 is rigidly mounted upon the shaft 81, and it will be understood that these sprocket wheels receive the chain 75, as illustrated in connection with the previously described form of my invention.

Also, similarly, a nut 84 is secured upon the upper threaded end 85 of the shaft 81 so that by adjusting this nut the blades 41 may be adjusted relatively to the plate 29a.

In this form of my invention the cutter blades will be relieved on their upper sides and the fingers of the plate 29a will be relieved on their lower faces, so that they will be self-sharpening as before and adjustment of the cutters may be made by the nut 84 so that a proper relationship may be established between the cutter blades and the shear fingers.

While I have shown and described some preferred embodiments of my invention, it will be understood that it is not to be limited to all the details shown but is capable of modification and variation within the spirit of the invention and within the scope of the appended claims.

What I claim is:

1. A mowing machine comprising a wheeled main frame, a triangular cutter frame projecting forwardly from the main frame and having a transversely extending hollow member at its forward end, a plurality of vertically disposed cutter shafts rotatably mounted in said member, a bladed cutter carried by each of said shafts above said member, a driving chain passing through said member and drivingly engaged with said shafts, and means on the main frame for driving said chain, said hollow member being of channel form in cross section and a finger bar closing the upper side of said member and having forwardly projecting fingers cooperating with said bladed cutters.

2. A mowing machine comprising a wheeled main frame, a triangular cutter frame projecting forwardly from the main frame and having a transversely extending hollow member at its forward end, a plurality of vertically disposed cutter shafts rotatably mounted in said member, a bladed cutter carried by each of said shafts above said member, said cutter frame also including a pair of tubular members, each secured at its forward end to one end of said transversely extending member, the rear ends of said tubular members converging toward, and being secured to, said main frame, a driving chain passing through said tubular members and said hollow member and drivingly engaged with said cutter shafts, and means on the main frame for driving said chain.

3. A mowing machine comprising a wheeled main frame, a triangular cutter frame projecting forwardly from the main frame and having a transversely extending hollow member at its forward end, a plurality of vertically disposed cutter shafts rotatably mounted in said member, a bladed cutter carried by each of said shafts above said member, said cutter frame also including a pair of tubular members, each secured at its forward end to one end of said transversely extending member, the rear ends of said tubular members converging toward, and being secured to, said main frame, a driving chain passing through said tubular members and said hollow member and drivingly engaged with said cutter shafts, means on the main frame for driving said chain, and wheeled supports at each end of said hollow member.

4. A mowing machine comprising a wheeled main frame, a triangular cutter frame extending forwardly from the main frame and having a transversely extending base member at its forward end and leg members extending toward the main frame, the apex of said cutter frame being disposed substantially centrally of and secured to the main frame, a plurality of vertically disposed cutter shafts rotatably mounted in said base member, a bladed cutter carried by each of said shafts above the base member, said base and leg members being hollow and having an endless driving chain extending therethrough and drivingly engaged with said cutter shafts in said transversely extending member to drive said cutters, and means on said main frame to drive said chain.

5. A mowing machine comprising a wheeled main frame, a triangular cutter frame extending forwardly from the main frame and having a transversely extending base member at its forward end and leg members extending toward the main frame, the apex of said cutter frame being disposed substantially centrally of and secured to the main frame, a plurality of vertically disposed cutter shafts rotatably mounted in said base member, a bladed cutter carried by each of said shafts above the base member, said base and leg members being hollow and having an endless driving chain extending therethrough and drivingly engaged with said cutter shafts in said transversely extending member to drive said cutters, and means on said main frame to drive said chain, and the blades of one cutter extending into the path of those of the cutters on each side thereof.

6. A mowing machine comprising a wheeled main frame, a triangular cutter frame extending forwardly from the main frame and having a transversely extending base member at its forward end and leg members extending toward the main frame, the apex of said cutter frame being disposed substantially centrally of and secured to the main frame, a plurality of vertically disposed cutter shafts rotatably mounted in said base member, a bladed cutter carried by each of said shafts above the base member, said base and leg members being hollow and having an endless driving chain extending therethrough and drivingly engaged with said cutter shafts in said transversely extending member to drive said cutters, means on said main frame to drive said chain, the blades of one cutter extending into the path of those of the cutters on each side thereof, and a finger bar supported on the upper surface of said base member and cooperating with said cutters.

7. A wheel-supported main frame, a motor carried by said frame above said wheels, a vertically disposed tubular member extending downwardly from said frame and having a shaft therein driven by the motor, a pair of tubular members extending forwardly and outwardly from said first-named tubular member and secured at their rear ends to the lower end of said first tubular member, a hollow transversely extending member secured to the forward ends of said pair of tubular members and forming therewith a triangular frame, an endless driving chain mounted in said triangular frame and drivingly engaged with said shaft, a plurality of cutter shafts rotatably carried by said transversely extending member, bladed cutters carried by said shafts above said last-named member, sprocket wheels carried by said cutter shafts within said hollow member with which said chain is engaged to drive the cutters, and a shear plate mounted on the upper surface of said hollow member to cooperate with said cutters.

8. A mower comprising a wheel-supported main frame, a triangular cutter frame secured adjacent its apex to said main frame and having leg members extending forwardly therefrom in a substantially horizontal plane, said cutter frame also having a base member at its forward end and having a plurality of cutter shafts rotatably mounted in the base member, bladed cutters carried by said shafts above said base member, all three members of said triangular frame being closed, hollow members in communication with each other to contain a lubricant, an endless driving chain mounted in the members of said cutter frame and drivingly engaged with said cutter shafts, a shear plate on said base member to cooperate with said bladed cutters and means on the main frame for driving said chain.

9. A mowing machine as in claim 1 wherein the opposing faces of the projecting fingers and the cutter blades are relieved inwardly of their cutting edges so as to be self-sharpening.

References Cited in the file of this patent

UNITED STATES PATENTS

| | | |
|---|---|---|
| 110,568 | Hawley | Dec. 27, 1870 |
| 2,264,118 | Krenzke | Nov. 25, 1941 |
| 2,489,204 | Sprick et al. | Nov. 22, 1949 |
| 2,532,230 | Hupp | Nov. 28, 1950 |